Patented Aug. 16, 1938

2,127,068

UNITED STATES PATENT OFFICE 2,127,068

MANUFACTURE OF TANNING AGENTS

Paul Müller, Neu-Allschwil, near Basel, Switzerland, assignor to the firm J. R. Geigy A. G., Basel, Switzerland No Drawing. Application April 25, 1935, Serial No. 18,256. In Germany May 11, 1934

8 Claims. (Cl. 149—5)

It is known from U. S. Specification No. 1,841,840 that substances of novel composition can be obtained by condensing the soluble products of the action of sulphonating agents on phenols with formaldehyde in the presence of urea or of its formaldehyde compounds. This condensation is conducted in a strongly acid solution, at a raised temperature and by a reaction of long duration. Leather which has been prepared with the aid of these substances as tanning agents is distinguished by a high degree of fullness and softness and by a light colour. The fastness to light is likewise good but nevertheless does not satisfy the highest requirements.

Furthermore it is known from German Specification No. 587,496 that by causing to react with the products of the sulphonation of aromatic hydrocarbons or their hydroxy derivatives the condensation products obtained in alkaline solution from urea and formaldehyde, especially dimethylal urea, there being used for each molecular proportion of urea more than one and up to two molecular proportions of formaldehyde, there are obtained tanning agents which are distinguished from the tanning agents of U. S. Specification No. 1,841,840 by their whiter colour and by their solubility in strongly acid solutions.

According to the present invention tanning agents having a high fastness to light are made by conducting the condensation of a phenol sulphonic acid with urea and formaldehyde under mild conditions of reaction. The products so obtained excel in their fastness to light the best of the products of German Specification No. 587,496 and, in contrast to the process of the last-named specification, they can be prepared in one operation with an economy in time and labour. By the aforesaid mild conditions of reaction there are to be understood a degree of acidity which is reduced by neutralization towards the neutral point. The temperature will be between the room temperature and 120° C. The acidity of the solution in conducting the condensation may be from 100 cc. to 5,000 cc. of normal caustic soda lye per kilogram of reaction mass (determined by titration).

The relative proportions of urea, formaldehyde and phenol sulphonic acid may vary within wide limits, but it is preferable to use at least one molecular proportion of formaldehyde for each molecular proportion of the phenolic body.

The invention also is not limited only to the use of urea, for its substitution products, as well as compounds which form urea, such as calcium cyanamide, are applicable in the process; the same is true of the formaldehyde, in place of which there may be used substances which yield formaldehyde or compounds of formaldehyde with urea, such as methylal and hexamethylenetetramine, which are of low molecular weight and have been prepared in acid solution.

The tanning agents made in accordance with the invention give the customary reactions of synthetic tanning agents. They differ from those of German Specification No. 587,496 in giving a blue precipitation with ferric salts; the product of Example 1 of the said German specification yields with iron salts a blue colour but no precipitation. In acid solution the new products tan animal hides with the production of a soft white leather of a fastness to light not hitherto attained. It will be understood that they may be used in combination tanning together with other tanning or non-tanning substances. Particularly in their action on chrome leather they are distinguished from the hitherto usual agents by the fact that they cover the leather in a manner practically fast to light.

The following examples illustrate the invention, the parts being by weight:—

Example 1

100 parts of crude cresol are sulphonated at 100–110° C. for 30 minutes with 100 parts of sulphuric acid mono-hydrate whilst a strong current of air is blown through the reaction mixture. The whole is then diluted to 250 parts whilst well stirring and 40 parts of urea are added. At an acidity of 10 grams of the cresol sulphonic acid=48.5 cc. of normal caustic soda solution there are added 168 parts of a caustic soda solution of 27.8 per cent strength and then rapidly 130 parts of formaldehyde of 30 per cent strength and the whole is heated to boiling in a reflux apparatus. At the commencement of the boiling the reaction mass gives a white precipitate on dilution with water but after about 5 minutes no precipitation occurs and a sample dissolves clearly in water. After boiling for 15 minutes under these conditions the reaction is ended and the product has a maximum fastness to light. The same result can be obtained by operating with a lower degree of acidity and a longer duration of reaction or with a higher degree of acidity and a correspondingly shorter duration of reaction. Finally the product is acidified with phosphoric acid to an acidity suitable for tanning.

Example 2

The procedure is as in Example 1 except that pure phenol is used instead of crude cresol and instead of 168 parts of caustic soda solution of 27.8 per cent strength at an acidity of 10 grams of phenol sulphonic acid=48.5 cc. of normal caustic soda solution there are used 180 parts of caustic potash solution of 29.3 per cent strength, the sodium salt of phenol sulphonic acid being too sparingly soluble. The duration of the condensation is 10 minutes.

Example 3

100 parts of crude phenol are sulphonated with 100 parts of sulphuric acid of 66° Bé. at 100–110° C. for 30 minutes, after which the non-sulphonated phenol is expelled by distillation with steam under reduced pressure and the whole is evaporated under reduced pressure until its weight is 250 parts. There are then added 30 parts of urea and, as described in Example 1, such a quantity of caustic soda solution that when the whole is subsequently boiled with 130 parts of formaldehyde of 30 per cent strength there is obtained in about 15 minutes a condensation product which is easily soluble in water and fast to light. The mass is then brought to a suitable acidity by addition of oxalic acid. A dilute solution of the product tans hides to a white leather of excellent fastness to light.

Example 4

100 parts of crude cresol are sulphonated with 100 parts of oleum (containing 26 per cent $SO_3$) by cautiously mixing and heating at 100–110° C. for 30 minutes and the sulphonation mass is diluted with 50 parts of water and brought to the acidity prescribed in Example 1. 40 parts of urea are then condensed with 130 parts of formaldehyde of 30 per cent strength by heating for a short while with the addition of 5 parts of dilute sulphuric acid (1:5) and the white mass so obtained is powdered. The urea-formaldehyde condensation product thus prepared is added to the cresol sulphonic acid solution made as above described and the whole is boiled for 15–20 minutes whereby the greater part of the white powder dissolves. There is obtained a product which, when brought to an acidity suitable for tanning, converts hides into white leather which is fast to light.

Example 5

100 parts of crude cresol are sulphonated as described in Example 1 and the sulphonation mixture is diluted with water to 250 parts. 20 parts of urea and 150 parts of caustic soda solution of 30 per cent strength are added, whereby the temperature rises to about 70° C. Then 70 parts of formaldehyde of 30 per cent strength are added and the whole is heated at 100° C. for 1–5 minutes. The reaction mass is then quickly cooled and there are added 10 parts of crystalline oxalic acid and 35 parts of phosphoric acid of 80 per cent strength. In dilute solution the product converts hides into white leather of good fastness to light.

What I claim is:—

1. A process for producing tanning substances by condensing the sulphonic acid of a monohydric phenolic body of the benzene series in the sulphonation mass itself (resulting from the sulphonation of the said monohydric phenolic body of the benzene series with a sulphonating agent) with formaldehyde in the presence of urea, said process consisting in carrying out such reaction at an acidity obtained by partial neutralization of the sulphonating mass with an acid binding agent.

2. A process for producing tanning substances by condensing the sulphonic acid of a monohydric phenolic body of the benzene series in the sulphonation mass itself (resulting from the sulphonation of the said monohydric phenolic body of the benzene series with a sulphonating agent) with formaldehyde in the presence of urea, said process consisting in carrying out such reaction at an acidity obtained by partial neutralization of the sulphonating mass with an acid binding agent to a degree lower than that of the sulphonation mass and higher than the equivalent of substantially 100 cc. or normal caustic soda lye per kilogram of reaction mass.

3. A process for producing tanning substances by condensing the sulphonic acid of a monohydric phenolic body of the benzene series in the sulphonation mass itself (resulting from the sulphonation of the said monohydric phenolic body of the benzene series with a sulphonating agent) with formaldehyde in the presence of urea, said process consisting in carrying out such reaction at an acidity obtained by partial neutralization of the sulphonating mass with an acid binding agent, which, however, does not go beyond the equivalent of substantially 100 cc. of normal caustic soda lye per kilogram of reaction mass.

4. A process for producing tanning substances by condensing the sulphonic acid of a monohydric phenolic body of the benzene series in the sulphonation mass itself (resulting from the sulphonation of the said monohydric phenolic body of the benzene series with a sulphonating agent) with formaldehyde in the presence of urea, said process consisting in carrying out such reaction at an acidity obtained by partial neutralization of the sulphonating mass with an acid binding agent, the acidity being lower than that of the sulphonation mass and higher than the equivalent of substantially 100 cc. of normal caustic soda lye per kilogram of reaction mass.

5. A process for producing tanning substances, consisting in adding urea to the soluble reaction product of oleum containing 26% of $SO_3$ with crude cresol, neutralizing partially with concentrated caustic soda lye to an acidity equivalent of about 200 cc. of normal caustic soda lye per kilogram of reaction mass, adding formaldehyde and boiling the whole for 15 minutes.

6. A process for producing tanning substances, consisting in adding urea to the soluble reaction product of oleum containing 26% of $SO_3$ with pure phenol, neutralizing partially with concentrated caustic potash solution to an acidity equivalent of substantially 1000 cc. of normal caustic potash lye per kilogram of reaction mass, adding formaldehyde and boiling the whole for 10 minutes.

7. A process for producing tanning substances, consisting in adding urea to the soluble reaction product of oleum containing 26% of $SO_3$ with crude phenol, neutralizing partially with concentrated caustic soda lye to an acidity equivalent of about 200 cc. of normal caustic soda lye per kilogram of reaction mass, adding formaldehyde and boiling the whole for 15 minutes.

8. A composition of matter which comprises the product obtained by condensing the sulphonic acid of a phenol with formaldehyde in the presence of urea in acid solution, the acidity of which is partially lowered by addition of an acid binding agent to a degree lower than that of the sulphonation mass and higher than the equivalent of substantially 100 cc. of normal caustic soda lye per kilogram of reaction mass, said products giving a white precipitation with an excess of mineral acid and showing the characteristics of the precipitation of basic dyestuffs, of the precipitation of albuminoids and gelatine, and of a blue precipitation with iron chloride.

PAUL MÜLLER.